US012568122B2

(12) United States Patent
Gonzalez-Rocha et al.

(10) Patent No.: US 12,568,122 B2
(45) Date of Patent: Mar. 3, 2026

(54) SYSTEM AND METHOD FOR CONTROLLING ACCESS TO A RESOURCE BASED ON A COMPLIANCE SCORE

(71) Applicant: EQUIFAX INC., Atlanta, GA (US)

(72) Inventors: Tomas Gonzalez-Rocha, Invergrove Heights, MN (US); Christina Morgan, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 22 days.

(21) Appl. No.: 18/882,096

(22) Filed: Sep. 11, 2024

(65) Prior Publication Data

US 2025/0088541 A1      Mar. 13, 2025

Related U.S. Application Data

(60) Provisional application No. 63/582,430, filed on Sep. 13, 2023.

(51) Int. Cl.
*H04L 9/40* (2022.01)
*H04L 41/16* (2022.01)
*H04L 41/22* (2022.01)

(52) U.S. Cl.
CPC .............. *H04L 63/20* (2013.01); *H04L 41/16* (2013.01); *H04L 41/22* (2013.01)

(58) Field of Classification Search
CPC .......... H04L 63/20; H04L 41/16; H04L 41/22
See application file for complete search history.

(56) References Cited

U.S. PATENT DOCUMENTS

| | | | | |
|---|---|---|---|---|
| 10,978,191 | B2* | 4/2021 | Collins, Jr. ............ | G16H 40/40 |
| 2001/0051787 | A1* | 12/2001 | Haller ................... | G16H 40/67 |
| | | | | 705/2 |
| 2002/0082665 | A1* | 6/2002 | Haller ................ | A61N 1/37264 |
| | | | | 607/60 |
| 2004/0015132 | A1* | 1/2004 | Brown .................. | G16H 20/10 |
| | | | | 600/300 |
| 2005/0192649 | A1* | 9/2005 | Shehadeh .......... | A61N 1/37211 |
| | | | | 607/60 |
| 2016/0019353 | A1* | 1/2016 | Cavagnaro ............. | G06Q 50/01 |
| | | | | 705/3 |
| 2023/0140160 | A1* | 5/2023 | Vetsch .................. | G06F 16/285 |
| | | | | 726/25 |

* cited by examiner

*Primary Examiner* — Abiy Getachew
(74) *Attorney, Agent, or Firm* — Kilpatrick Townsend & Stockton LLP

(57) ABSTRACT

A system can generate one or more compliance graphs and a compliance score that can be used at least in risk assessment operations. The system can access a request to visualize target entity data and calculate a compliance score for the target entity. The system can access attribute data. The system can generate one or more compliance graphs and a compliance score using the attribute data. The system can compare the compliance score to a compliance threshold and transmit a message including the results of the comparison to a remote system for controlling access of the target entity to an interactive computing environment.

20 Claims, 5 Drawing Sheets

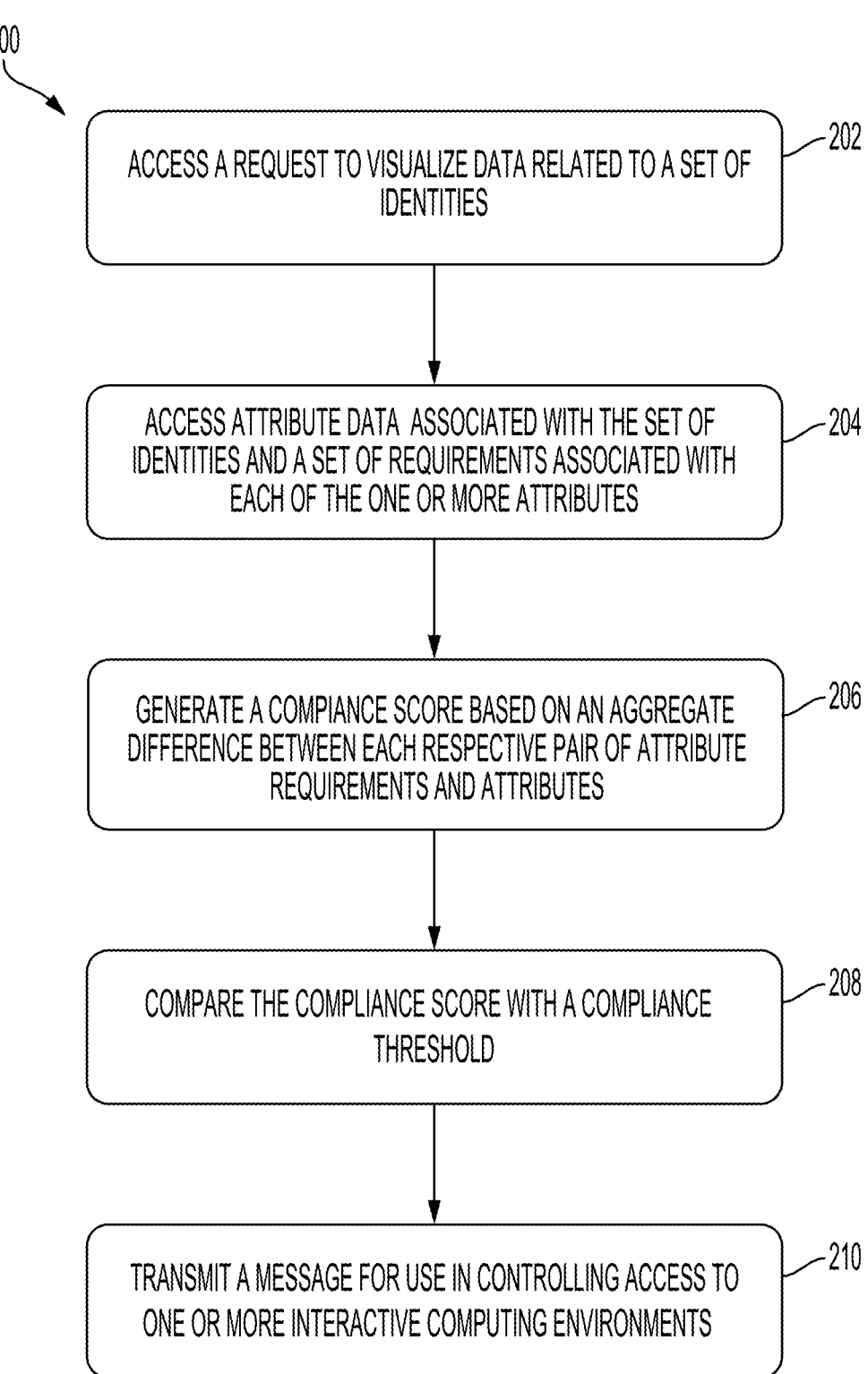

200

ACCESS A REQUEST TO VISUALIZE DATA RELATED TO A SET OF IDENTITIES ⟋202

ACCESS ATTRIBUTE DATA ASSOCIATED WITH THE SET OF IDENTITIES AND A SET OF REQUIREMENTS ASSOCIATED WITH EACH OF THE ONE OR MORE ATTRIBUTES ⟋204

GENERATE A COMPIANCE SCORE BASED ON AN AGGREGATE DIFFERENCE BETWEEN EACH RESPECTIVE PAIR OF ATTRIBUTE REQUIREMENTS AND ATTRIBUTES ⟋206

COMPARE THE COMPLIANCE SCORE WITH A COMPLIANCE THRESHOLD ⟋208

TRANSMIT A MESSAGE FOR USE IN CONTROLLING ACCESS TO ONE OR MORE INTERACTIVE COMPUTING ENVIRONMENTS ⟋210

*FIG. 2*

SYSTEM AND METHOD FOR CONTROLLING ACCESS TO A RESOURCE BASED ON A COMPLIANCE SCORE

CROSS-REFERENCE TO RELATED APPLICATIONS

This claims priority to U.S. Provisional Application No. 63/582,430, entitled "SYSTEM AND METHOD FOR CONTROLLING ACCESS TO A RESOURCE BASED ON A COMPLIANCE SCORE," filed on Sep. 13, 2023, the entire content of which is hereby incorporated by reference in its entirety.

TECHNICAL FIELD

The present disclosure relates generally to risk assessment and to controlling access to a secure resource. More specifically, but not by way of limitation, this disclosure relates to risk assessment using a compliance score. The compliance score can be used as a factor in granting or denying access of a target entity to a secure resource.

BACKGROUND

Access restrictions may be placed on electronic resources in order to restrict access by unauthorized entities. Authentication of an entity may be based on compliance of that entity with attribute requirements. For example, an attribute may be information indicative of a characteristic of an identity associated with the entity. Certain access restrictions can be based on whether one or more attributes of identities associated with the entity are in compliance with a predetermined set of attribute requirements. Providing access to a secured resource may be difficult since other systems may not account for compliance of the entity with external identity metrics or may not account for changes in compliance requirements.

SUMMARY

Various aspects of the present disclosure provide systems and methods for generating one or more compliance graphs and a compliance score that can be used at least in risk assessment operations. A system can include a processor and a non-transitory computer-readable medium that can include instructions that are executable by the processor to cause the processor to perform various operations. The system can receive a request to visualize data relating to a set of identities associated with a target entity. The data can include one or more attributes associated with each identity of the set of identities. The system can receive (i) attribute data associated with the set of identities and (ii) attribute requirement data comprising a set of attribute requirements associated with each attribute of the one or more attributes. The system can generate a compliance score by aggregating a difference between each respective pair of a set of attribute requirement and attribute pairs. The set of attribute requirement and attribute pairs can include the attribute data and the one or more attributes. The system can compare the compliance score with a compliance threshold. The system can transmit, to a remote computing device, a message including at least the compliance score and a result of comparing the compliance score with the compliance threshold for use in controlling access of the target entity to one or more interactive computing environments.

In other aspects, a method can be used to generate one or more compliance graphs and a compliance score that can be used at least in risk assessment operations. The method can include receiving a request to visualize data relating to a set of identities associated with a target entity. The data can include one or more attributes associated with each identity of the set of identities. The method can include receiving (i) attribute data associated with the set of identities and (ii) attribute requirement data including a set of attribute requirements associated with each attribute of the one or more attributes. The method can include generating a compliance score by aggregating a difference between each respective pair of a set of attribute requirement and attribute pairs. The set of attribute requirement and attribute pairs can include the attribute data and the one or more attributes. The method can include comparing the compliance score with a compliance threshold. The method can include transmitting, to a remote computing device, a message including at least the compliance score and a result of comparing the compliance score with the compliance threshold for use in controlling access of the target entity to one or more interactive computing environments.

In other aspects, a non-transitory computer-readable medium can include instructions that are executable by a processing device for causing the processing device to perform various operations. The operations can include receiving a request to visualize data relating to a set of identities associated with a target entity. The data can include one or more attributes associated with each identity of the set of identities. The operations can include receiving (i) attribute data associated with the set of identities and (ii) attribute requirement data including a set of attribute requirements associated with each attribute of the one or more attributes. The operations can include generating a compliance score by aggregating a difference between each respective pair of a set of attribute requirement and attribute pairs. The set of attribute requirement and attribute pairs can include the attribute data and the one or more attributes. The operations can include comparing the compliance score with a compliance threshold. The operations can include transmitting, to a remote computing device, a message including at least the compliance score and a result of comparing the compliance score with the compliance threshold for use in controlling access of the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF DRAWINGS

FIG. 2 is a flowchart of a process for controlling access to a resource according to certain aspects of the present disclosure.

DETAILED DESCRIPTION

Figure 1:
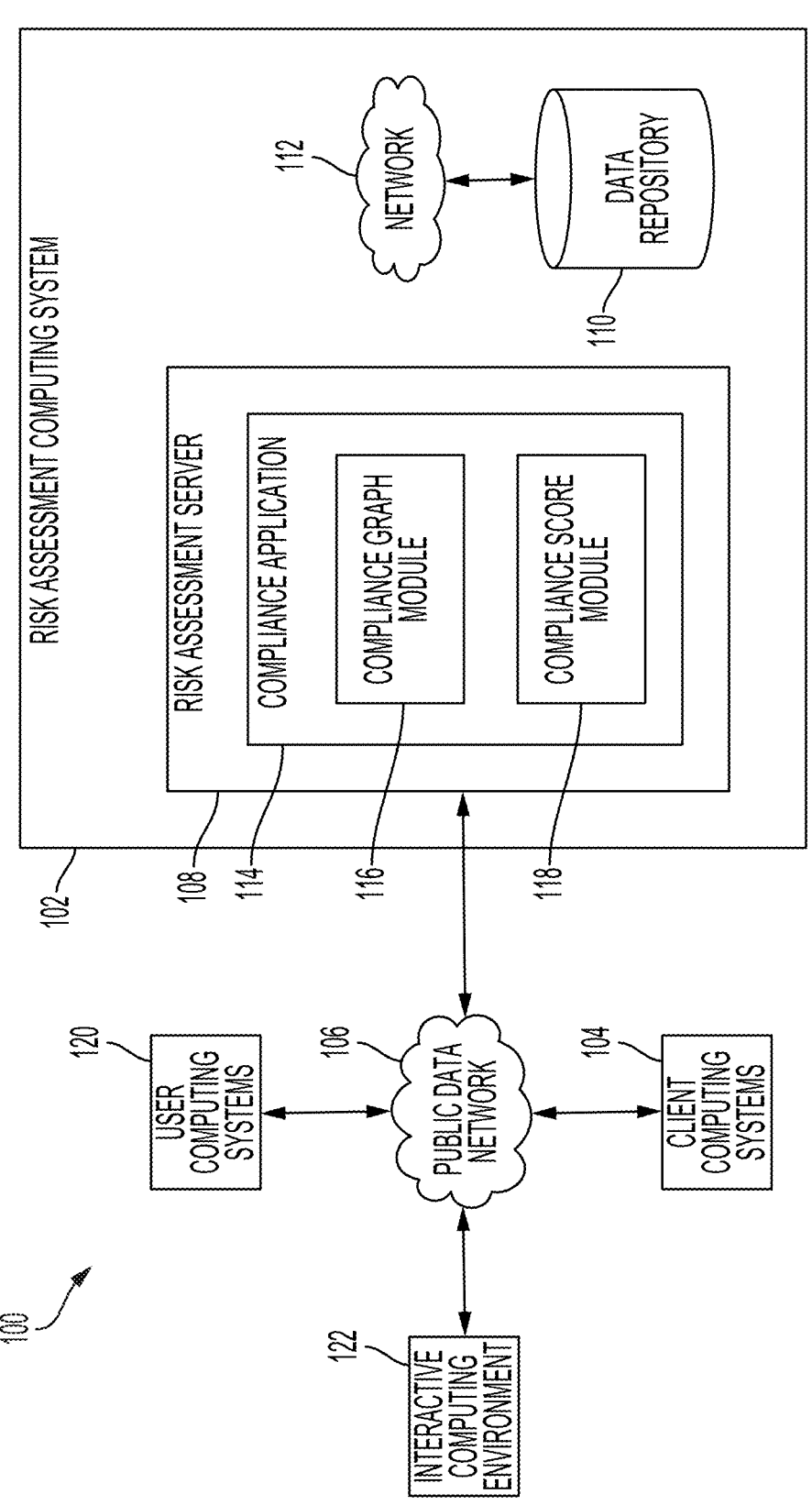
FIG. 1 is a block diagram depicting an example of a system for controlling access to a resource according to certain aspects of the present disclosure.

Certain aspects of the present disclosure relate to computer and electronic security and techniques for preventing unauthorized access to electronic resources based on compliance of a target entity with various metrics in which the various metrics are based on attributes of identities associated with the target entity. In some examples, the various metrics may include metrics that are required, such as to allow access to resources, for the target entity. An attribute may be or include a characteristic of an identity. As an example, a system may require the attributes of identities associated with a target entity to meet one or more requirements. If the target entity is not in compliance with the requirements, the target entity may be denied access to a secure resource. The requirements may be received from external sources and may vary over time. Accordingly, there is a need for systems and methods that control access to secured resources based on compliance of the target entity with varying requirements.

A compliance GUI can be generated and used to improve a graphical user interface, other functions of a computing device, or a technical field such as the technical field of access control to a particular resource. The compliance GUI may display one or more compliance graphs to visually illustrate attributes or aggregated attributes of the identities associated with the target entity, as well as the compliance requirements. In some examples, the one or more compliance graphs can be used to provide a compliance score, to visualize or otherwise provide access to data or inferences not otherwise accessible to a user, to control access to an interactive computing environment or other suitable resources, and the like. For example, generating the compliance GUI and one or more compliance graphs can facilitate decisions on access control, resource distribution, and the like. For example, the compliance GUI may display the compliance score and may also illustrate, via the one or more compliance graphs, factors affecting the compliance score. Additionally or alternatively, a user may interact with one or more elements of the compliance GUI to explore which attributes affect the compliance score and to view how changes in attributes may change the compliance score. Accordingly, projections can be made about the future compliance of the target entity.

Certain aspects and features described herein for generating a compliance GUI, one or more compliance graphs, and a compliance score, etc. can facilitate, or otherwise control, access of a target entity to a secure resource based on attributes of the identities associated with the target entity or a subset thereof. In some examples, the one or more compliance graphs can be generated to include data associations not otherwise accessible by a user of a graphical user interface. Such data included in the one or more compliance graphs may be data retrieved from separate data sources and aggregated such that the aggregate data can be compared with one or more requirements. The one or more requirements may be received from external or internal data sources, which may be monitored for changes to the requirements. Additionally or alternatively, the one or more compliance graphs can be generated to provide a visualization of contextual information, such as aggregated attribute data for a subset of identities associated with the target entity. In an example, the compliance score can be used to control access to an interactive computing environment or other suitable computing resources. For example, in response to determining that a target entity attempting to access the interactive computing environment is not compliant with identity requirements, a computing device can determine to challenge or deny access of the target entity to the interactive computing environment.

In some examples, the compliance GUI can include one or more compliance graphs. The one or more compliance graphs can include a histogram, line graph, pie chart, table, bar graph, and the like for displaying aggregate attribute data for the identities associated with the target entity or aggregate attribute data for a subset of identities associated with the target entity. A subset of identities can refer to any subset of the total population of identities associated with the target entity, such as a team, department, demographic, geographic location, or other metrics. The metrics can be used alone or in combination to filter the data displayed in the one or more compliance graphs or the credential score for a particular subset of identities. In addition to filtering by metric, temporal filters can be used to view or generate periodic (e.g., daily, monthly, yearly, etc.) compliance reports. In some examples, the period can be determined automatically based on retrieved compliance requirements. In another example, historic compliance data can be retrieved for previous periods and can be displayed such that a user can analyze trends in historic compliance data and compliance scores and compare these with current compliance data and compliance scores.

In some examples, the compliance GUI may efficiently provide the one or more compliance graphs and the compliance score in an interactive computing environment. The compliance GUI may provide the one or more compliance graphs and the compliance score in a visually efficient way such that a user of the compliance GUI is not overwhelmed by excessive information displayed on the graphical user interface. Further, the compliance GUI can display the one or more compliance graphs, which may illustrate the data used to generate the compliance score. Additionally, the compliance GUI may provide potential access to all information used to generate the compliance score, for example via interactive elements of the one or more compliance graphs as well as via adjustable filters. For example, the compliance GUI may expressly display a subset of information included in the compliance score and may embed the remaining information in the set of interactive elements. The user may interact with one or more interactive elements of the set of interactive elements to cause the compliance GUI to display the requested information. Thus, the compliance GUI can provide the compliance score in a visually efficient manner and can also provide a visualization, via the one or more compliance graphs, of the data used to generate the compliance score, as well as a breakout of the particular requirements that provide the basis for the compliance score.

In some examples, such as examples in which the compliance score can be used to control access to an interactive computing environment, the interactive computing environment can be provided by a client computing system. The client computing system can be, or can be associated with, a provider entity, an organization, or the like that may provide software as a service, infrastructure as a service, other suitable services, etc. accessible by a user computing system that can be used by the entity, which may be or include a user of the compliance GUI. In some examples, the interactive computing environment can include the compliance GUI or any other suitable user interface. The user computing system can be employed by a user associated with a target entity to request access on behalf of the target entity to a particular user interface that can be used to request services or other suitable computing resources from the client computing system. For example, the target entity can request a financial loan, cloud computing storage resources, access to protected information, or any other suitable services or computing resources from the client computing system via the interactive computing environment. In other examples, the interactive computing environment can include one or more websites or subpages thereof. For example, the interactive computing environment can include a secure website provided by the client computing system. The secure website can include cloud computing storage or other resources, and the client computing system can control access of the target entity to the secure website via the entity profile and, optionally, other suitable security techniques such as multi-factor authentication, username/ password combinations, etc.

Certain aspects described herein, which can include generating the compliance score, generating the one or more compliance graphs, and generating the compliance GUI, and the like, can improve the technical fields of user interfaces, access control for a computing environment or other computing resources, other suitable technical fields, or any combination thereof. For instance, by using the compliance score, a risk assessment computing system may provide legitimate access to the interactive computing environment and improve the access control for the computing environment by reducing memory usage, reducing processing time, reducing network bandwidth consumption, reducing errors in access grants, reducing response time, and the like with respect to controlling access to the interactive computing environment using the compliance score. The compliance score can indicate, for example, a degree to which the target entity complies with requirements, such as requirements for accessing a secure resource, defined by an entity that controls the resources. In some embodiments, the compliance score can represent a model that can indicate a likelihood relating to a set of entities. The likelihood may involve a diversity or other demographic measure associated with the set of entities. The compliance score can be determined based on a function received from the entity controlling the resource or can be an aggregate of compliance scores associated with each attribute that are determined by comparing each attribute with an attribute requirement of the entity.

Additionally, the graphical user interface that is configured to display the one or more compliance graphs and the compliance score may be or include one or more improvements to graphical user interfaces. For example, the compliance GUI may provide contextual information, such as attribute data or aggregate attribute data used to determine the compliance score, via the one or more compliance graphs, and may specifically arrange the underlying data of the compliance score to facilitate previously unknown inferences about the underlying data, the fulfilment of one or more external requirements, and the like.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Generating a Compliance Score for Risk Assessment Referring now to the drawings, FIG. 1 is a block diagram illustrating an example of a computing environment 100 in which a compliance score can be generated and used for risk assessment according to certain aspects of the present disclosure. FIG. 1 illustrates examples of hardware components of a risk assessment computing system 102 according to some aspects. The risk assessment computing system 102 can be or include a specialized computing system that may be used for processing large amounts of data, such as for generating the compliance score and one or more compliance graphs, for controlling access to the interactive computing environment 122, etc., using a large number of computer processing cycles. The risk assessment computing system 102 can include a risk assessment server 108 for validating risk assessment data from various sources. In some examples, the risk assessment computing system 102 can include other suitable components, servers, subsystems, etc.

The risk assessment server 108 can include one or more processing devices that can execute program code such as a compliance application 114, and the like. The program code can be stored on a non-transitory computer-readable medium or other suitable medium. In some examples, a compliance graph module 116 can execute one or more processes to generate one or more compliance graphs for use in risk assessment, for use in controlling access to the interactive computing environment 122, or a combination thereof. In another example, the compliance score module 118 can execute one or more processes to generate a compliance score for a target entity. The risk assessment server 108 can perform risk assessment validation operations or access control operations for validating or otherwise authenticating (e.g., using other suitable modules, models, components, etc. of the risk assessment server 108) received data such as attribute data accessed via the user computing systems 120. In some aspects, the compliance application 114 can authenticate the request by utilizing a compliance score or compliance graph or any inference determined therefrom. The compliance score and the one or more compliance graphs can be determined using accessed attribute data of a set of identities associated with the target entity, as well as requirement data, that can include real-time streamed data about a target entity, real-time produced data about the target entity, historical data associated with the target entity, attribute data associated with identities of the target entity etc.

The accessed attribute data can be determined or otherwise received and can be stored in one or more network-attached storage units on which various repositories, databases, or other structures can be stored. Examples of the data structures can include a data repository 110. Additionally or alternatively, a training dataset can be stored in the data repository 110 and can be used by the compliance score module 118 to generate a compliance score. In some examples, the training dataset can be used to train one or more machine-learning models. The one or more machine-learning models can be trained to determine the one or more compliance graphs, to determine the compliance score, or to determine any inferences about the target entity based on the compliance score to control access to the interactive computing environment 122 using the compliance score, or to otherwise provide digital enablement for the target entity.

Network-attached storage units may store a variety of different types of data organized in a variety of different ways and from a variety of different sources. For example, the network-attached storage unit may include storage other than primary storage located within the risk assessment server 108 that is accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include a magnetic disk or tape, optical storage media such as a compact disk or digital versatile disk, flash memory, memory devices, or other suitable media.

Furthermore, the risk assessment computing system 102 can communicate with various other computing systems. The other computing systems can include user computing systems 120 (e.g., smartphones, personal computers, etc.), client computing systems 104, and other suitable computing systems. For example, user computing systems 120 may send requests for accessing the interactive computing environment 122 to the client computing systems 104. In response, the client computing systems 104 can send the authentication queries to the risk assessment server 108, and the risk assessment server 108 can access attribute data about identities associated with the target entity for generating and using the one or more compliance graphs and the compliance score. While FIG. 1 illustrates the risk assessment computing system 102 and the client computing systems 104 as separate systems, they can be one system. For example, the risk assessment computing system 102 can be included in the client computing systems 104, or vice versa.

As illustrated in FIG. 1, the risk assessment computing system 102 may interact with the client computing systems 104, the user computing systems 120, or a combination thereof via one or more public data networks 106 to facilitate interactions between users of the user computing systems 120 and the interactive computing environment 122. For example, the risk assessment computing system 102 can facilitate the client computing systems 104 providing a user interface to the user computing system 120 for receiving various data from the user. The risk assessment computing system 102 can transmit validated risk assessment data, for example inferences from the one or more compliance graphs, the compliance score, or any combination thereof, to the client computing systems 104 for providing (or challenging, rejecting, otherwise controlling, etc.) access of the target entity to the interactive computing environment 122, or to provide other suitable risk assessments. In some examples, the risk assessment computing system 102 can additionally communicate with third-party systems through the public data network 106 to access additional risk assessment, attribute, or requirement data, etc. For example, the third-party systems can provide real-time, or streamed, attribute or requirement data, etc. to the risk assessment computing system 102.

Each client computing system 104 may include one or more devices that may include individual servers or groups of servers operating in a distributed manner. A client computing system 104 can include any computing device or group of computing devices operated by a seller, a lender, a provider, or other suitable entity that can provide products or services. The client computing system 104 can include one or more server devices. The one or more server devices can include or can otherwise access one or more non-transitory computer-readable media.

The client computing system 104 can further include one or more processing devices that can be configured to provide an interactive computing environment 122, such as a user interface, etc., that can perform various operations. The interactive computing environment 122 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 120 to access various functions of the interactive computing environment 122. For instance, the interactive computing environment 122 may transmit data to and receive data (e.g., via the graphical interface) from a user computing system 120 to shift between different states of the interactive computing environment 122, where the different states allow one or more electronics interactions between the user computing system 120 and the client computing system 104 to be performed.

In some examples, the client computing system 104 may include other computing resources associated therewith, which may not be illustrated in FIG. 1, such as server computers hosting and managing virtual machine instances for providing cloud computing services, server computers hosting and managing online storage resources for users, server computers for providing database services, and others. The interaction between the user computing system 120, the client computing system 104, and the risk assessment computing system 102, or any suitable sub-combination thereof may be performed through graphical user interfaces, such as the user interface, presented by the risk assessment computing system 102, the client computing system 104, other suitable computing systems of the computing environment 100, or any suitable combination thereof. The graphical user interfaces can be presented to the user computing system 120. Application programming interface (API) calls, web service calls, or other suitable techniques can be used to facilitate interaction between any suitable combination or sub-combination of the client computing system 104, the user computing system 120, and the risk assessment computing system 102.

A user computing system 120 can include any computing device or other communication device operated by a user or entity such as a consumer or a customer. The user computing system 120 can include one or more computing devices such as laptops, smartphones, and other personal computing devices. A user computing system 120 can include executable instructions stored in one or more non-transitory computer-readable media. The user computing system 120 can additionally include one or more processing devices configured to execute program code to perform various operations. In various examples, the user computing system 120 can allow a user to access certain online services or other suitable products, services, or computing resources from a client computing system 104, to engage in mobile commerce or other interactions with the client computing system 104, to obtain controlled access to electronic content, such as the interactive computing environment 122, hosted by the client computing system 104, etc.

A user can use the user computing system 120 to engage in an electronic interaction with the client computing system 104 via the interactive computing environment 122. The risk assessment computing system 102 can access a request, for example from the user computing system 120, to access the interactive computing environment 122 and can use data, such as the one or more compliance graphs and the compliance score, to determine whether to provide access, to challenge the request, to deny the request, etc. An electronic interaction between the user computing system 120 and the client computing system 104 can include, for example, the user computing system 120 being used to request online computing resources, or other suitable services or products from the client computing system 104, etc. An electronic interaction between the user computing system 120 and the client computing system 104 can also include, for example, one or more queries for a set of sensitive or otherwise controlled data, accessing online confidential services provided via the interactive computing environment 122, submitting compliance reports via the interactive computing environment 122, operating an electronic tool within the interactive computing environment 122 (e.g., a content-modification feature, an application-processing feature, etc.), etc.

In some aspects, an interactive computing environment 122 implemented through the client computing system 104 can be used to provide access to various online functions. As a simplified example, a user interface or other interactive computing environment 122 provided by the client computing system 104 can include electronic functions for requesting computing resources, online storage resources, network resources, database resources, or other types of resources. In another example, a website or other interactive computing environment 122 provided by the client computing system 104 can include electronic functions for obtaining funding, reporting compliance information, generating compliance reports, etc.

A user computing system 120 can be used to request access to the interactive computing environment 122 provided by the client computing system 104. The client computing system 104 can submit a request, for example in response to a request made by the user computing system 120 to access the interactive computing environment 122, for risk assessment to the risk assessment computing system 102 and can selectively grant or deny access to various electronic functions based on risk assessment performed by the risk assessment computing system 102. Based on the request, the risk assessment computing system 102 can generate the one or more compliance graphs and the compliance score for a target entity specified by the user via the user computing system 120. Based on the one or more compliance graphs and the compliance score generated by the risk assessment server 108, the risk assessment computing system 102, the client computing system 104, or a combination thereof can determine whether to grant the access request of the user computing system 120 to certain features of the interactive computing environment 122.

In a simplified example, the system depicted in FIG. 1 can configure the risk assessment server 108 to be used for controlling access to the interactive computing environment 122. The risk assessment server 108 can access data about a target entity that submitted a request to access the interactive computing environment 122, for example, based on the information (e.g., collected by the client computing system 104 via a user interface provided to the user computing system 120 or retrieved from one or more external data sources) provided by the client computing system 104 or received via other suitable computing systems. The risk assessment server 108 can access, for example from an internal or external database, attribute data for one or more identities, or a subset thereof, associated with the target entity such that the one or more compliance graphs and the compliance score are based on the accessed attribute data. In some examples, compliance requirements may be retrieved from one or more external databases and may be used, in part, to generate the one or more compliance graphs and the compliance score. The risk assessment server 108 can transmit the compliance score, or other suitable inferences associated with the compliance score or the one or more compliance graphs, to the client computing system 104 for use in controlling access to the interactive computing environment 122 or for other suitable risk assessment purposes. The compliance score may be determined from a comparison of the attribute data to one or more compliance requirements, for example, by using graph analysis, or by applying the one or more compliance graphs to a machine-learning model trained on a set of compliance graphs.

In some examples, the one or more compliance graphs and the compliance score can be used, for example by the risk assessment computing system 102, the client computing system 104, etc., to determine whether the risk associated with the target entity accessing a service provided by the client computing system 104 exceeds a threshold, thereby granting, challenging, or denying access by the entity to the interactive computing environment 122. For example, if the risk assessment computing system 102 determines that the compliance score, which can be indicative of compliance of the target entity with compliance requirements, is lower than a threshold value, then the client computing system 104 associated with the service provider can generate or otherwise provide access permission to the user computing system 120 that requested the access. The access permission can include, for example, cryptographic keys used to generate valid access credentials or decryption keys used to decrypt access credentials. The client computing system 104 can also allocate resources to the target entity and provide a dedicated web address or network address for the allocated resources to the user computing system 120, for example, by adding the user computing system 120 in the access permission. With the obtained access credentials or the dedicated web address, the user computing system 120 can establish a secure network connection to the interactive computing environment 122 hosted by the client computing system 104 and access the resources via invoking API calls, web service calls, HTTP requests, other suitable mechanisms or techniques, etc.

In some examples, the risk assessment computing system 102 may determine whether to grant, challenge, or deny the access request made by the user computing system 120 for accessing the interactive computing environment 122. For example, based on the one or more compliance graphs and the compliance score, the risk assessment computing system 102 can determine that the target entity is in compliance with one or more requirements necessary for access and may authenticate the request. In other examples, the risk assessment computing system 102 can challenge or deny the access attempt if the risk assessment computing system 102 determines that the target entity is not in compliance with one or more requirements based on the compliance score.

Each communication within the computing environment 100 may occur over one or more data networks, such as a public data network 106, a network 112 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices illustrated in FIG. 1 is provided for illustrative purposes. Different numbers of devices may be used. For example, while certain devices or systems are illustrated as single devices in FIG. 1, multiple devices may instead be used to implement these devices or systems. Similarly, devices or systems that are shown as separate, such as the risk assessment server 108 and the data repository 110, may be instead implemented in a single device or system. Similarly and as discussed above, the risk assessment computing system 102 may be included in the client computing system 104.

Techniques for Generating a Compliance Score and Controlling Access Using a Compliance Score FIG. 2 is a flowchart depicting an example of a process 200 for generating a graphical user interface having one or more compliance graphs and a compliance score according to certain aspects of the present disclosure. One or more computing devices, such as the risk assessment computing system 102, can implement the operations illustrated in FIG. 2 by executing suitable program code such as the compliance graph module 116 and the compliance score module 118. For illustrative purposes, the process 200 is described with reference to certain examples illustrated in the figures. Other implementations, however, are possible.

At block 202, the process 200 involves accessing a request to visualize data relating to a set of identities associated with a target entity. The data may include identity data, attribute data, target entity data, demographic data, or any combination thereof. The identity data may imply or otherwise represent an identity of the target entity. The attribute data can represent characteristics of the identities associated with the target entity. The characteristics can include employment data, demographic data, location data, other. The request may be generated, submitted, or a combination thereof by the client computing systems 104, by a user of the risk assessment computing system 102, by other entities or computing devices, or any suitable combination thereof. In a particular example, the risk assessment computing system 102 may access a request from the client computing systems 104 for determining a risk assessment for a target entity attempting to access an interactive computing environment 122. The risk assessment computing system 102 may generate and submit a request, for example to the risk assessment server 108, to generate one or more compliance graphs and a compliance score to facilitate risk assessment determinations regarding the target entity or the request from the client computing systems 104.

At block 204, the process 200 involves accessing attribute data associated with the set of identities and a set of requirements associated with each of the one or more attributes. The attribute data can be accessed on internal or external data sources. In some examples, the risk assessment computing system 102 can access an external data source via the public data network 106, the risk assessment computing system 102 can access attribute and requirement data by accessing the data repository 110, etc. The attribute data received by the risk assessment computing system 102 can include identity data points, attribute data points, target entity data points, and the like that can be input into or otherwise transmitted to the compliance graph module 116 or the compliance score module 118 for facilitating generation of the one or more compliance graphs and the compliance score for the target entity.

At block 206, the process 200 involves generating a compliance score based on an aggregate difference between each respective requirement-attribute pair. The risk assessment computing system 102, or any component thereof (e.g., the compliance application 114), may generate one or more compliance graphs illustrating the attribute data, a comparison of the attribute data and the requirement associated with the attribute, etc., and a compliance score for the target entity. In some examples, the process 200 can also include generating one or more compliance graphs that can include charts or graphs, such as pie charts, bar charts, histograms, data tables, and the like for illustrating the attribute data of the identities associated with the target entity. As an illustrative example, a chart displayed by a compliance GUI may illustrate the historic value of an attribute for the set of identities associated with the target entity. The chart can display the attribute's change in value as a function of time and may display a projected future value. The chart can also display the required value of the attribute as defined by requirement data.

In some examples, the compliance score can be generated based on the comparison between each attribute and its associated requirement. The comparison data for each attribute can be aggregated, analyzed, or otherwise combined to generate the compliance score. In some examples, a weighted combination of the difference between each attribute and its requirement may be used. In other examples, a machine-learning model can be applied to the attribute and requirement data to generate a predicted compliance score. In yet other examples, the compliance score can provide an indication of the number of requirements that are satisfied or that are not satisfied by the attribute data, or may provide a binary indicator that all requirements are met or are not met. In some examples, the compliance score can be generated by applying a function to a set of compliance scores, where each compliance score of the set is associated with an attribute. Each of the set of compliance scores can be based on a comparison of the attribute value to an attribute requirement. The set of compliance scores can be combined to generate a total compliance score, for example by taking an average or weighted average of the compliance scores. In some examples, the method for determining the compliance score from the attributes can be a unique formula received from an external entity.

At block 208, the process 200 involves comparing the compliance score with a compliance threshold. The compliance threshold can be a minimum required compliance score needed for the target entity to access a secure resource. In some examples, the compliance threshold can be set by an external entity, such as a government or regulatory body. The compliance threshold can define a minimum amount of compliance with the attribute requirements that the target entity must meet to access a secure resource. For example, a target entity that is not compliant with the attribute requirements, e.g., the compliance score is below the compliance threshold, may not be granted access to a secure resource. As described below, a generated compliance GUI can enable a user to examine the attribute data underlying the target entity's compliance score to determine one or more attributes that are causing the target entity to not be compliant with the attribute requirements.

At block 210, the process 200 involves transmitting a message, for example to an external server or to the interactive computing environment 122 for use in controlling access to one or more interactive computing environments. For example, the message may indicate the target entity's compliance score, as well as a comparison between the compliance score and the compliance threshold, which may be unique to the target entity or to a set of entities to which the target entity belongs. For example, the compliance threshold for a target entity can be based on the number of identities associated with the target entity, the target entity's age, or a financial metric of the target entity. The message can also include the data used to generate the compliance score as well as a listing of each attribute and attribute requirement.

In some examples, the process 200 may additionally include generating a graphical user interface configured to provide the one or more compliance graphs and the compliance score in response to the request to visualize data relating to the target entity. The graphical user interface may be generated to provide, such as display, the one or more compliance graphs in a single GUI and may be generated to present the compliance score. For example, a compliance GUI can be generated and output on a display device associated with the risk assessment computing system 102. In other examples, the risk assessment computing system 102 may generate the compliance GUI and transmit the graphical user interface to a separate computing system such as the client computing systems 104. The risk assessment computing system 102 can use the one or more compliance graphs or the compliance score to control access to the interactive computing environment 122.

The one or more compliance graphs can be displayed on the compliance GUI. In some examples, the one or more compliance graphs can be arranged on the compliance GUI to provide or otherwise facilitate previously unattainable or previously unknown information about the target entity or its compliance with attribute requirements. For example, the compliance GUI can display historic attribute data as well as current data and future projections. Additionally or alternatively, one or more selectable filters can enable a user to view particular attribute data, such as data related to a subset of identities or to a particular date or time period. Additionally or alternatively, the compliance GUI enables the user to view the particular components that go into the displayed compliance score. For example, the compliance GUI can display charts, graphs, or other data visualizations related to the attributes and attribute requirements. Additionally or alternatively, the compliance GUI can display a total achievable compliance score, which represents the maximum score attainable by a target entity.

The arrangement of the one or more compliance graphs and the compliance score may facilitate inferences and other determinations. For example, the arrangement of the one or more compliance graphs can allow a user of the compliance GUI to determine that a particular attribute is causing the target entity to have a reduced compliance score.

Additionally or alternatively, the external entity may have reporting requirements for the target entity. The process 200 can include automatically generating a report including the compliance score and the one or more compliance graphs. The report can be generated and transmitted to the external entity manually or automatically on a periodic basis. The report can include a set of the one or more compliance graphs, or a customized set of compliance graphs as defined by parameters received from the external entity. The parameters can define which attributes are reported for which identities and in what time period.

Process for Controlling Access Using a Compliance Score

Figure 3:
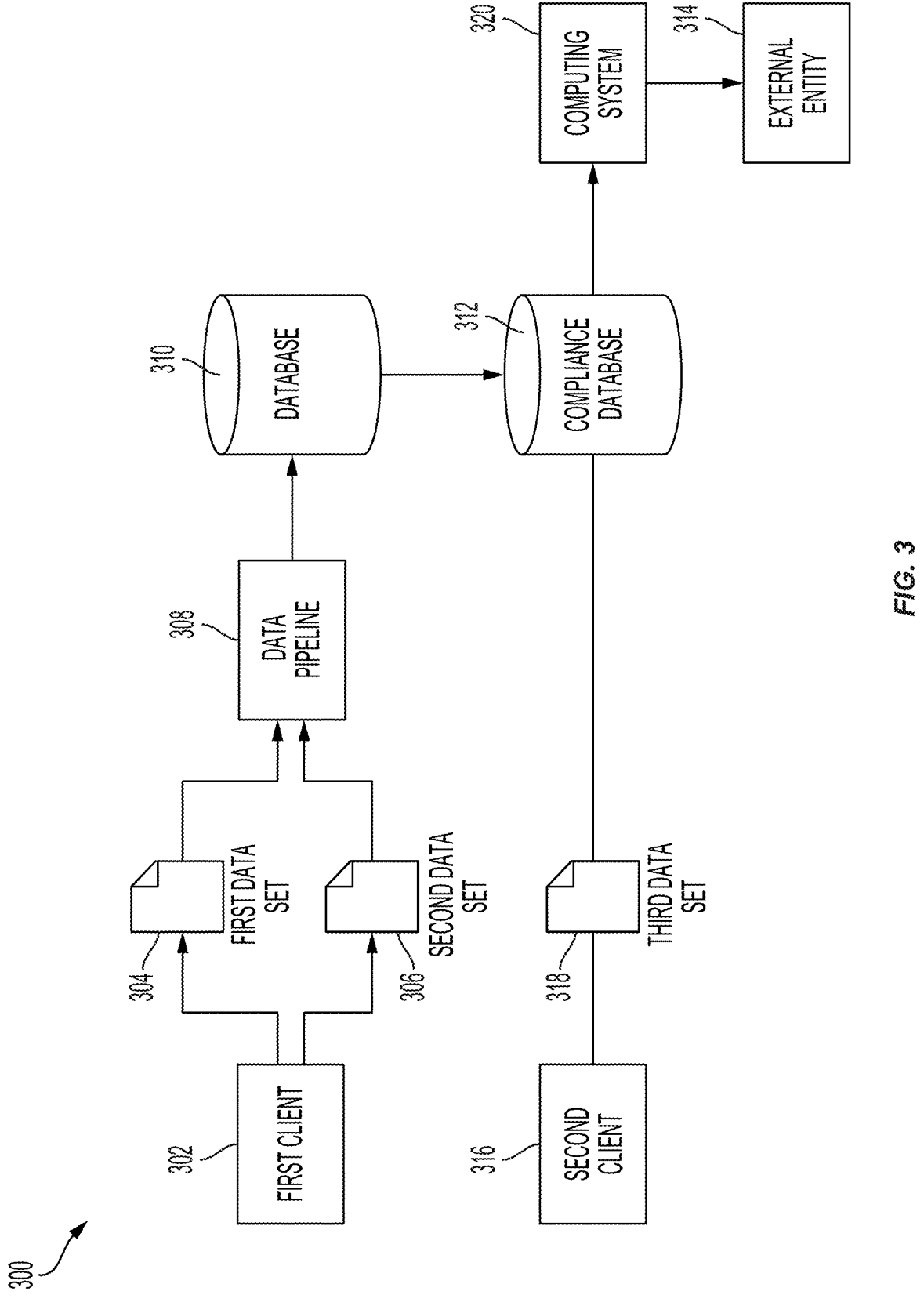
FIG. 3 is a diagram of a data flow for generating compliance reports for controlling access to a resource according to certain aspects of the present disclosure.

FIG. 3 is a process flow chart depicting an example of a process 300 for controlling access to an interactive computing environment using a compliance score according to certain aspects of the present disclosure. The process 300 can be executed, for example, using one or more components of the computing environment 100.

A first client 302 can be a particular user of the risk assessment computing system 102 or of services provided by the operator of risk assessment computing system 102. The first client 302 can be a client having a particular data set such as a first data set 304. The first data set 304 can be a data set of the first client 302 that is stored in a database associated with the first client 302. In other examples, the first data set 304 can be a data set within a database 310 to which the first client 302 has access.

The first data set 304 can include data related to identities associated with a target entity. In some examples, the target entity is the first client 302. The first data set 304 can include attribute data associated with each identity. Attribute data can include, for example, demographic data, financial data, geographic location data, and the like.

The first client 302 can manage a second data set 306, which can be stored separately from the first data set 304. The second data set 306 can include additional attribute data associated with each identity.

The first data set 304 and the second data set 306 can be processed in a data pipeline 308. The data pipeline 308 can be associated with the first client 302 or may be managed by the computing system 320. The data pipeline 308 can include one or more processes for compiling and transmitting data to the database 310. For example, the data pipeline 308 can be or include one or more processes or operations configured to transfer the first data set 304 and the second data set 306 from a database of the first client 302 to the database 310, which can be a physical database or a cloud-based database. In some examples, the database 310 can be managed by the computing system 320.

In some examples, the data pipeline 308 can include processes for merging the first data set 304 and the second data set 306. The merging may include mapping attribute data to a particular identity that is common to both the first data set 304 and the second data set 306. In another example, data pipeline 308 can include operations for deduplicating attribute data or identity data.

The merged first data set 304 and second data set 306 can be transmitted from the database 310 to a compliance database 312. In some examples, the compliance database 312 can store additional attribute data associated with the identities of the target entity. The compliance database 312 can also store compliance score threshold data and attribute requirements. The compliance score threshold and attribute requirements can be received from one or more external sources, such as from an external entity 314, and can be periodically updated.

A computing system 320 can access data stored in the compliance database 312 to generate one or more compliance graphs and a compliance score for a target entity. The computing system 320 can be, for example, a risk assessment computing system 102. The computing system 320 can transmit the one or more compliance graphs and the compliance score to the external entity 314.

In some examples, the computing system 320 can generate one or more reports based on reporting requirements of the external entity 314. The one or more reports can include attribute data associated with the set of identities of a subset of identities associated with the target entity. In some examples, the computing system 320 can generate a number of reports to a number of different external entities having different reporting requirements. The report can also indicate a compliance score based on the attribute requirements of the particular external source.

In another example, the computing system 320 can be used by an internal user to view historic attribute data, current attribute data, and projected future attribute data for the identities or a subset of the identities as will be described with reference to FIG. 4.

In some aspects, the compliance database 312 can access additional attribute data, such as data received as part of e-commerce or financial transactions. This attribute data can be generated in a computing environment of a second client 316. The second client can be the same as the first client 302 in some examples. Identities interacting with the computing environment of the second client 316 can generate attribute data through direct or indirect interactions with the computing environment of the second client 316 to generate a third data set 318. The third data set 318 can be transmitted to the compliance database 312 and merged with existing attribute data to supplement the existing attribute data.

Example of a Compliance GUI

Figure 4:
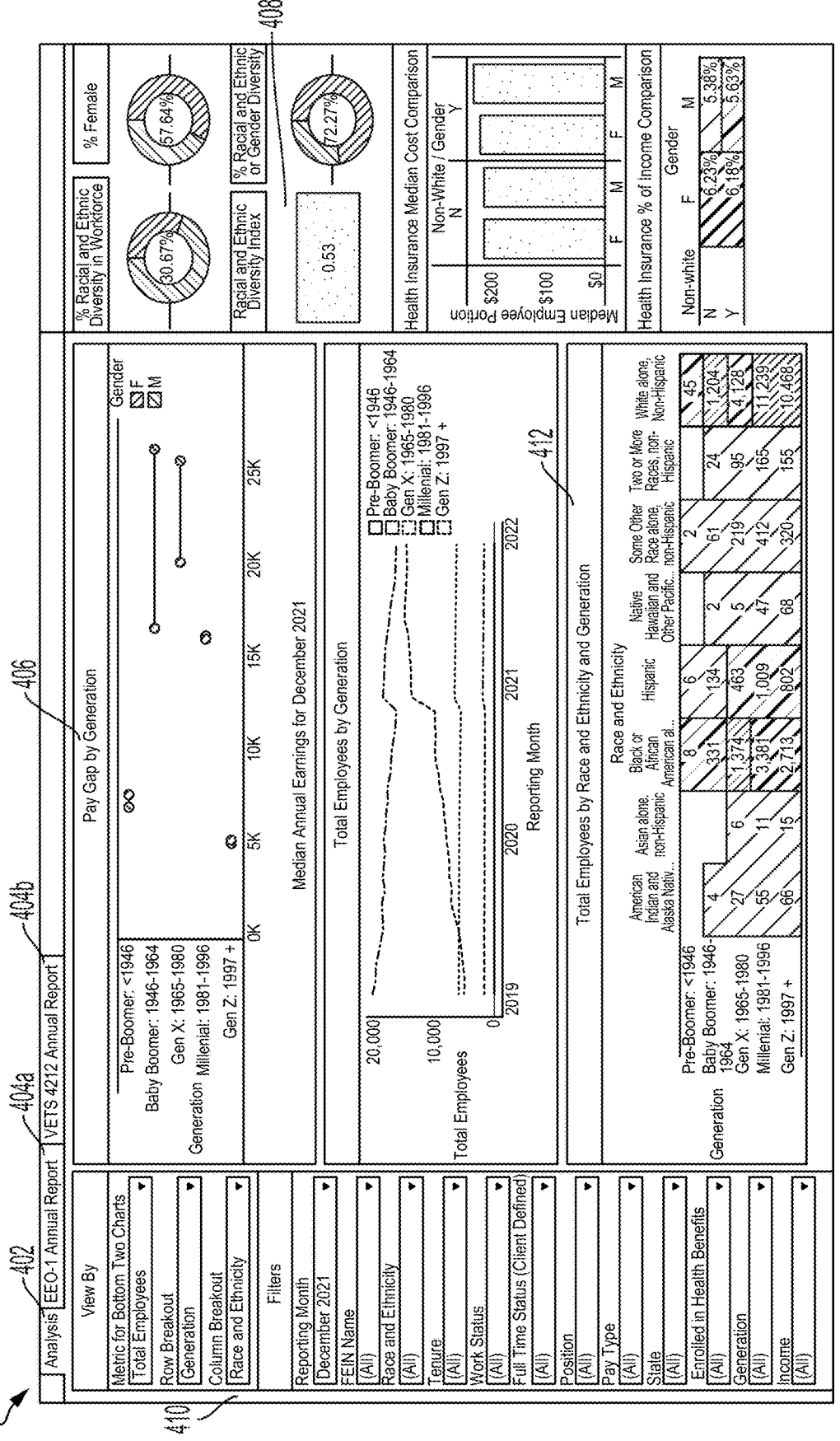
FIG. 4 is an example of a graphical user interface (GUI) that can facilitate controlling access to a resource according to certain aspects of the present disclosure.

FIG. 4 is an example of a compliance GUI 400 according to certain aspects of the present disclosure. As illustrated in FIG. 4, the compliance GUI 400 can include an analysis tab 402 and one or more reporting tabs 404*a* and 404*b*.

The analysis tab 402 can include one or more charts, graphs, tables, and other data visualizations. The analysis tab 402 can display the data visualizations for at least a subset of the identities associated with a target entity. As an example, plot 406 can display a graphical representation of an attribute, such as a pay gap, for the identities of the target entity in which the identities are grouped into categories based on one or more characteristics (e.g., generation). In some examples, generations or other categories can be defined by an external entity, such as a government or regulating body, or can be manually defined by the user.

In some examples, the analysis tab 402 can display a compliance score associated with a target entity. The compliance score can be based on whether a particular attribute for a set or subset of identities meets an attribute requirement set by the external entity. As an illustrative example, the compliance GUI 400 can display a diversity index compliance score 408. The diversity index compliance score 408 can indicate, for example, a measure of how closely one or more attributes, such as demographic attributes, of the identities associated with the target entity meet an attribute requirement such as a demographic attribute requirement. The diversity index compliance score 408 can be, for example, on a scale of zero to one in which a one represents complete compliance with the attribute requirement. The compliance score can be calculated based on a difference between the attribute requirement and the attribute of the set of identities. Other mathematical means, such as linear regression, etc., can be used to determine the compliance score.

In some examples a compliance score can be determined for each attribute or for one or more sets of attributes of a set or subset of identities. A total compliance score can be determined based on an average, weighted average, aggregation, or other method of combining compliance scores. The compliance score can be a percentage, integer value within a range (e.g., 0 to 5), a binary value, or other indicator of whether attribute data meets a required value. In other examples, the compliance score can be determined based on a function or formula received from an external entity, such that the compliance score indicates whether the attributes of the target entity comply with requirements of the external entity.

In some examples, the compliance GUI 400 can include a pane 410 that includes parameters for the one or more compliance graphs displayed by the compliance GUI 400. The pane 410 can enable a user to filter, sort, or otherwise manipulate the data that is displayed by the compliance GUI 400. For example, the pane 410 can enable the user to configure the rows and columns of a table (e.g., table 412) displayed by the compliance GUI 400. In another example, the pane 410 can include a number of selectable filters such that a user can filter the displayed data to a specific subset of identities, time period, or other identity characteristic.

Through the use of the parameter tools in the pane 410, a user can easily navigate the attribute data, as well as view an adjusted compliance score specific to a selected subset of identities or time period. In some examples, the risk assessment computing system 102 can include one or more machine learning models configured to predict a future compliance score based on historic attribute data. Accordingly, the user can view past, present, and predicted future attribute data and compliance scores. Further, the compliance GUI 400 enables the user to view compliance score components such as a component of the compliance score based on a particular attribute.

In some examples, the compliance GUI 400 can overlay or otherwise display a target attribute value based on an attribute requirement. For example, the plot 406 can optionally display a required maximum pay gap based on requirement information received from an external entity.

The reporting tabs 404*a* and 404*b* can display reporting data that is required by one or more external entities. For example, the reporting data can be generated based on parameters received from an external entity. For example, the parameters received from the external entity can dictate which data is included in the report, for what time period, and in what format.

In some examples, a user can use the compliance score displayed by the compliance GUI 400 to determine a risk associated with the target entity and to determine whether to grant the target entity access to an interactive computing environment. For example, compliance GUI 400 enables a user to view the compliance score and to interactively explore the components of the compliance score to determine a set of steps that can be taken by the target entity to reach a compliance score above a threshold to enable the target entity to access the interactive computing environment.

Example of Computing System

Figure 5:
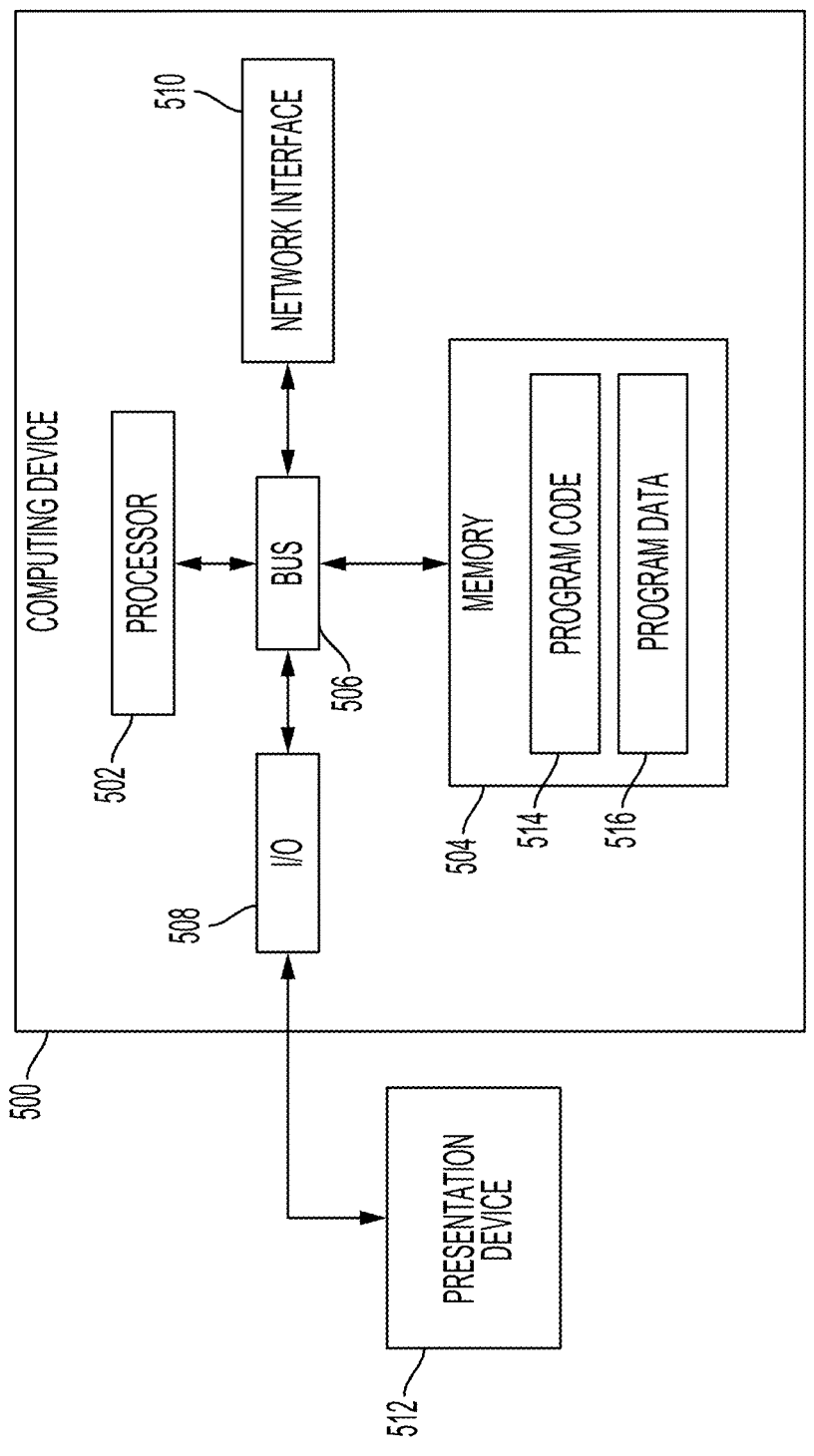
FIG. 5 is a block diagram of an example of a computing device according to certain aspects of the present disclosure.

Any suitable computing system or group of computing systems can be used to perform the operations for the machine-learning operations described herein. For example, FIG. 5 is a block diagram illustrating an example of a computing device 500, which can be used to implement the risk assessment server 108 or other suitable components of the computing environment 100. The computing device 500 can include various devices for communicating with other devices in the computing environment 100, as described with respect to FIG. 1. The computing device 500 can include various devices for performing one or more data consolidation or validation (or other suitable) operations described above with respect to FIGS. 1-4.

The computing device 500 can include a processor 502 that is communicatively coupled to a memory 504. The processor 502 can execute computer-executable program code stored in the memory 504, can access information stored in the memory 504, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 502 can include a microprocessor, an application-specific integrated circuit (ASIC), a field-programmable gate array (FPGA), or any other suitable processing device. The processor 502 can include any suitable number of processing devices, including one. The processor 502 can include or communicate with a memory 504. The memory 504 can store program code that, when executed by the processor 502, causes the processor 502 to perform the operations described herein.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 500 may also include a number of external or internal devices such as input or output devices. For example, the computing device 500 is illustrated with an input/output interface 508 that can receive input from input devices or provide output to output devices. A bus 506 can also be included in the computing device 500. The bus 506 can communicatively couple one or more components of the computing device 500.

The computing device 500 can execute program code 514 that can include the compliance graph module 116 and the compliance score module 118. The program code 514 for the compliance graph module 116 and the compliance score module 118 may be resident in any suitable computer-readable medium and may be executed on any suitable processing device. For example, as depicted in FIG. 5, the program code 514 for the compliance graph module 116 and the compliance score module 118 can reside in the memory 504 at the computing device 500 along with the program data 516 associated with the program code 514, such as the historical data 124. Executing the compliance graph module 116 and the compliance score module 118 can configure the processor 502 to perform at least some of the operations described herein.

In some aspects, the computing device 500 can include one or more output devices. One example of an output device can be the network interface device 510 depicted in FIG. 5. A network interface device 510 can include any device or group of devices suitable for establishing a wired or wireless data connection to one or more data networks described herein. Non-limiting examples of the network interface device 510 can include an Ethernet network adapter, a modem, etc.

Another example of an output device can include the presentation device 512 depicted in FIG. 5. A presentation device 512 can include any device or group of devices suitable for providing visual, auditory, or other suitable sensory output. Non-limiting examples of the presentation device 512 can include a touchscreen, a monitor, a speaker, a separate mobile computing device, etc. In some aspects, the presentation device 512 can include a remote client-computing device that communicates with the computing device 500 using one or more data networks described herein. In other aspects, the presentation device 512 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A system comprising:
a processor; and
a non-transitory computer-readable medium comprising instructions that are executable by the processor to cause the processor to perform operations comprising:
receiving a request to visualize data relating to a set of identities associated with a target entity, the data comprising one or more attributes associated with each identity of the set of identities;
receiving (i) attribute data associated with the set of identities and (ii) attribute requirement data comprising a set of attribute requirements associated with each attribute of the one or more attributes;
generating a compliance score by aggregating a difference between each respective pair of a set of attribute requirement and attribute pairs, the set of attribute requirement and attribute pairs comprising the attribute data and the one or more attributes;
comparing the compliance score with a compliance threshold; and
transmitting, to a remote computing device, a message comprising at least the compliance score and a result of comparing the compliance score with the compliance threshold for use in controlling access of the target entity to one or more interactive computing environments.

2. The system of claim 1, wherein the operations further comprise generating a graphical user interface configured to provide one or more compliance graphs and the compliance score in response to the request to visualize data relating to the target entity, the graphical user interface comprising a plurality of interactive elements representing each compliance graph of the one or more compliance graphs, wherein each interactive element of the plurality of interactive elements is selectable to display (i) previously non-displayed information associated with a subset of the set of identities and (ii) a second compliance score based on the subset of the set of identities.

3. The system of claim 2, wherein the operation of comparing the compliance score with the compliance threshold comprises adjusting the graphical user interface to cause the result of comparing the compliance score with the compliance threshold to be provided via the graphical user interface.

4. The system of claim 2, wherein the graphical user interface is configured to provide a projection of a change of a particular attribute of the one or more attributes at a future time, and wherein the change of the particular attribute is predictable using machine-learning.

5. The system of claim 1, wherein the operations further comprise:
accessing a first data set and a second data set; and
generating the attribute data based on a mapping of identity data from the first data set to identity data of the second data set.

6. The system of claim 5, wherein the operation of generating the attribute data further comprises merging the first data set and the second data set based on a particular identity that is common with respect to the first data set and the second data set.

7. The system of claim 6, wherein the operation of merging the first data set and the second data set based on the particular identity that is common with respect to the first data set and the second data set further comprises deduplicating the attribute data after merging the first data set and the second data set.

8. A method comprising:
receiving a request to visualize data relating to a set of identities associated with a target entity, the data comprising one or more attributes associated with each identity of the set of identities;
receiving (i) attribute data associated with the set of identities and (ii) attribute requirement data comprising a set of attribute requirements associated with each attribute of the one or more attributes;
generating a compliance score by aggregating a difference between each respective pair of a set of attribute requirement and attribute pairs, the set of attribute requirement and attribute pairs comprising the attribute data and the one or more attributes;
comparing the compliance score with a compliance threshold; and
transmitting, to a remote computing device, a message comprising at least the compliance score and a result of comparing the compliance score with the compliance threshold for use in controlling access of the target entity to one or more interactive computing environments.

9. The method of claim 8, further comprising generating a graphical user interface configured to provide one or more compliance graphs and the compliance score in response to the request to visualize data relating to the target entity, the graphical user interface comprising a plurality of interactive elements representing each compliance graph of the one or more compliance graphs, wherein each interactive element of the plurality of interactive elements displays, in response to being selected, (i) previously non-displayed information associated with a subset of the set of identities and (ii) a second compliance score based on the subset of the set of identities.

10. The method of claim 9, wherein comparing the compliance score with the compliance threshold comprises adjusting the graphical user interface to cause the result of comparing the compliance score with the compliance threshold to be provided via the graphical user interface.

11. The method of claim 9, wherein the graphical user interface provides a projection of a change of a particular attribute of the one or more attributes at a future time, and wherein the change of the particular attribute is predicted using machine-learning.

12. The method of claim 8, further comprising:
accessing a first data set and a second data set; and
generating the attribute data based on mapping identity data from the first data set to identity data of the second data set.

13. The method of claim 12, wherein generating the attribute data further comprises merging the first data set and the second data set based on a particular identity that is common with respect to the first data set and the second data set.

14. The method of claim 13, wherein merging the first data set and the second data set based on the particular identity that is common with respect to the first data set and the second data set further comprises deduplicating the attribute data after merging the first data set and the second data set.

15. A non-transitory computer-readable medium comprising instructions that are executable by a processing device for causing the processing device to perform operations comprising:
receiving a request to visualize data relating to a set of identities associated with a target entity, the data comprising one or more attributes associated with each identity of the set of identities;
receiving (i) attribute data associated with the set of identities and (ii) attribute requirement data comprising a set of attribute requirements associated with each attribute of the one or more attributes;
generating a compliance score by aggregating a difference between each respective pair of a set of attribute requirement and attribute pairs, the set of attribute requirement and attribute pairs comprising the attribute data and the one or more attributes;
comparing the compliance score with a compliance threshold; and
transmitting, to a remote computing device, a message comprising at least the compliance score and a result of comparing the compliance score with the compliance threshold for use in controlling access of the target entity to one or more interactive computing environments.

16. The non-transitory computer-readable medium of claim 15, wherein the operations further comprise generating a graphical user interface configured to provide one or more compliance graphs and the compliance score in response to the request to visualize data relating to the target entity, the graphical user interface comprising a plurality of interactive elements representing each compliance graph of the one or more compliance graphs, wherein each interactive element of the plurality of interactive elements is selectable to display (i) previously non-displayed information associated with a subset of the set of identities and (ii) a second compliance score based on the subset of the set of identities.

17. The non-transitory computer-readable medium of claim 16, wherein the operation of comparing the compliance score with the compliance threshold comprises adjusting the graphical user interface to cause the result of comparing the compliance score with the compliance threshold to be provided via the graphical user interface.

18. The non-transitory computer-readable medium of claim 16, wherein the graphical user interface is configured to provide a projection of a change of a particular attribute of the one or more attributes at a future time, and wherein the change of the particular attribute is predictable using machine-learning.

19. The non-transitory computer-readable medium of claim 15, wherein the operations further comprise:

accessing a first data set and a second data set; and generating the attribute data based on a mapping of identity data from the first data set to identity data of the second data set.

20. The non-transitory computer-readable medium of claim 19, wherein the operation of generating the attribute data further comprises:

merging the first data set and the second data set based on a particular identity that is common with respect to the first data set and the second data set; and deduplicating the attribute data after merging the first data set and the second data set.

\* \* \* \* \*